United States Patent
Tilley et al.

(10) Patent No.: US 10,655,447 B2
(45) Date of Patent: May 19, 2020

(54) ROTARY STEERABLE DRILLING TOOL AND METHOD

(71) Applicant: Halliburton Energy Services, Inc., Houston, TX (US)

(72) Inventors: Jim Darin Tilley, Kingwood, TX (US); Neelesh Deolalikar, Houston, TX (US); Ravi Prabath Nanayakkara, Kingwood, TX (US); Michael Dewayne Finke, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/759,193

(22) PCT Filed: Oct. 12, 2015

(86) PCT No.: PCT/US2015/055082
§ 371 (c)(1),
(2) Date: Mar. 9, 2018

(87) PCT Pub. No.: WO2017/065724
PCT Pub. Date: Apr. 20, 2017

(65) Prior Publication Data
US 2018/0252088 A1    Sep. 6, 2018

(51) Int. Cl.
*E21B 7/06*     (2006.01)
*E21B 44/00*    (2006.01)
*E21B 21/10*    (2006.01)
*E21B 47/024*   (2006.01)
*E21B 34/06*    (2006.01)
*E21B 47/18*    (2012.01)

(52) U.S. Cl.
CPC .............. *E21B 44/005* (2013.01); *E21B 7/06* (2013.01); *E21B 21/10* (2013.01); *E21B 47/024* (2013.01); *E21B 34/066* (2013.01); *E21B 47/18* (2013.01)

(58) Field of Classification Search
CPC .......... E21B 44/005; E21B 7/06; E21B 21/10
See application file for complete search history.

(56) References Cited

U.S. PATENT DOCUMENTS

| | | | |
|---|---|---|---|
| 5,673,763 | A | 10/1997 | Thorp |
| 5,685,379 | A | 11/1997 | Barr et al. |
| 6,089,332 | A | 7/2000 | Barr et al. |
| 7,389,830 | B2 | 6/2008 | Turner et al. |

(Continued)

FOREIGN PATENT DOCUMENTS

| | | |
|---|---|---|
| GB | 2259316 | 3/1993 |
| GB | 2450498 | 12/2008 |

OTHER PUBLICATIONS

International Search Report and Written Opinion of PCT Application No. PCT/US2015/055082 dated Feb. 15, 2016: pp. 1-15.

*Primary Examiner* — Taras P Bemko
(74) *Attorney, Agent, or Firm* — Chamberlain Hrdlicka

(57) ABSTRACT

A directional drilling system includes a rotary steerable tool. The rotary steerable tool includes an extendable member configured to extend outwardly from the rotary steerable tool upon actuation, and a geolocation electronics device configured to track a position of the rotary steerable tool and the extendable member and control actuation of the extendable member. The geolocation electronics device and extendable member are configured to rotate with the rotary steerable tool.

16 Claims, 10 Drawing Sheets

(56) References Cited

U.S. PATENT DOCUMENTS

| | | | |
|---|---|---|---|
| 8,302,703 B2 | 11/2012 | Rolovic | |
| 8,376,067 B2 | 2/2013 | Downton et al. | |
| 8,672,056 B2 | 3/2014 | Clark et al. | |
| 8,869,916 B2 * | 10/2014 | Clausen | E21B 7/06 175/61 |
| 9,109,402 B1 * | 8/2015 | Lasater | E21B 7/062 |
| 10,113,363 B2 | 10/2018 | Cobern | |
| 2001/0042643 A1 | 11/2001 | Krueger et al. | |
| 2004/0016571 A1 | 1/2004 | Krueger | |
| 2005/0150692 A1 | 7/2005 | Ballantyne et al. | |
| 2006/0113113 A1 | 6/2006 | Underwood et al. | |
| 2011/0147086 A1 | 6/2011 | Hummes et al. | |
| 2014/0014413 A1 | 1/2014 | Niina et al. | |
| 2014/0333310 A1 * | 11/2014 | Lozinsky | G01B 7/14 324/346 |

* cited by examiner

ROTARY STEERABLE DRILLING TOOL AND METHOD

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Directional drilling is commonly used to drill any type of well profile where active control of the well bore trajectory is required to achieve the intended well profile. For example, a directional drilling operation may be conducted when the target pay zone cannot be reached from a land site vertically above it. Directional drilling operations involve varying or controlling the direction of a downhole tool (e.g., a drill bit) in a wellbore to direct the tool towards the desired target destination. Examples of directional drilling systems include point-the-bit rotary steerable drilling systems and push-the-bit rotary steerable drilling systems. In both systems, the drilling direction is changed by repositioning the bit position or angle with respect to the well bore. Push-the-bit tools use pads on the outside of the tool which press against the well bore thereby causing the bit to press on the opposite side causing a direction change. Point-the-bit technologies cause the direction of the bit to change relative to the rest of the tool.

Many directional drilling systems and techniques are based on rotary steerable systems, which allow the drill string to rotate while changing the direction of the borehole. However, these systems typically require a physical geostationary component near the drill bit which does not rotate with the drill bit in order to keep track of the position of the system.

BRIEF DESCRIPTION OF THE DRAWINGS

For a detailed description of the embodiments of the invention, reference will now be made to the accompanying drawings in which.

DETAILED DESCRIPTION

The present disclosure provides methods and systems for directional drilling. Specifically, the present disclosure provides a directional drilling system, such as a rotary steerable system (RSS), with a geolocation device. The geolocation device rotates with the drill shaft while the system tracks tool position and controls actuation of one or more extendable members to direct the drill bit. Thus, the entire system can rotate and stationary parts can be eliminated, resulting in a more reliable and simplistic tool. Specifically, there is no relative rotation between the parts of the system. Thus, bearings can be eliminated and load transfer across components is simplified.

Figure 1:
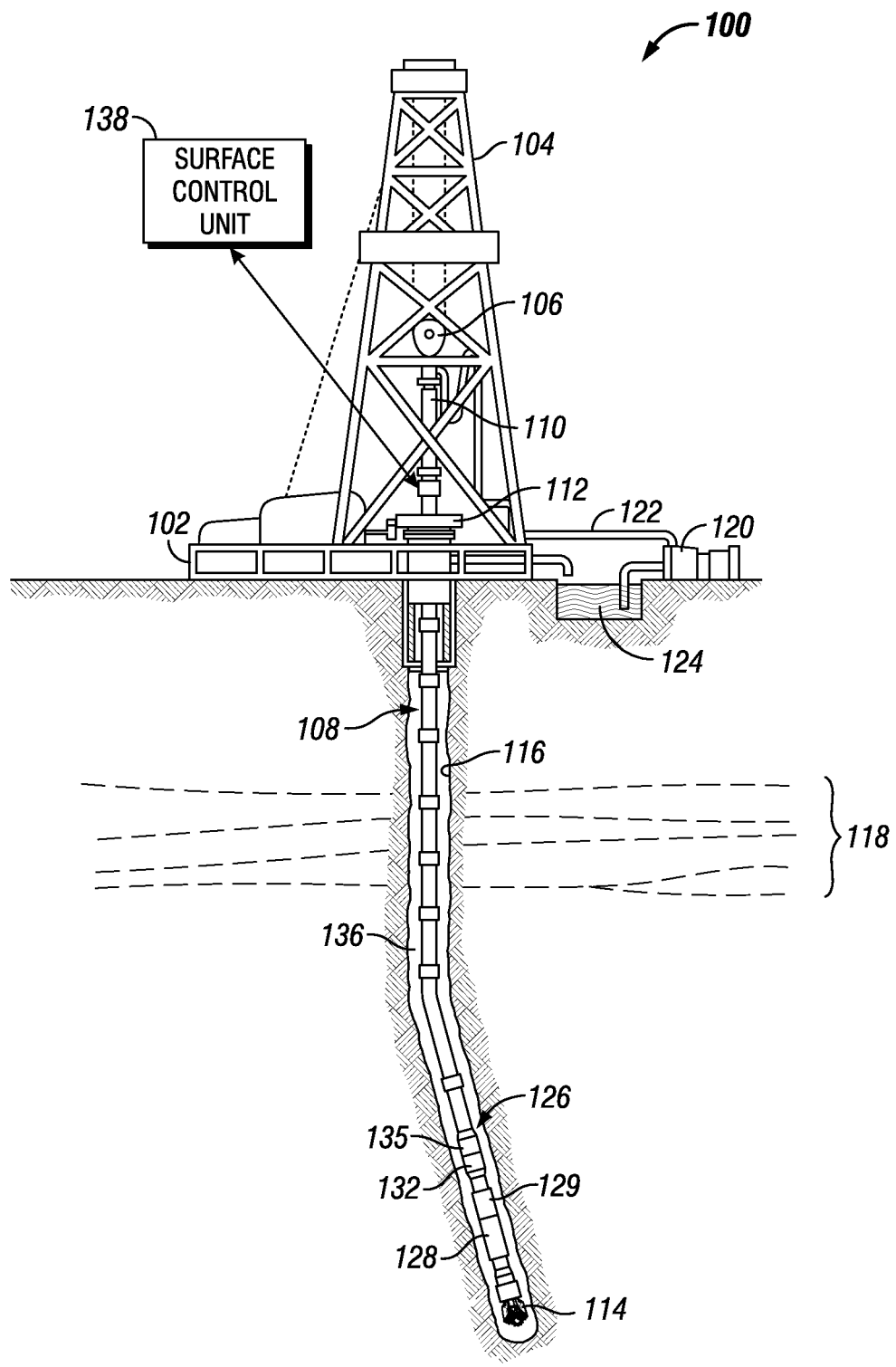
FIG. 1 depicts a schematic view of a directional drilling operation, in accordance with one or more embodiments.

Turning now to the figures, FIG. 1 depicts a schematic view of a drilling operation utilizing a directional drilling system 100, in accordance with one or more embodiments. The system of the present disclosure will be specifically described below such that the system is used to direct a drill bit in drilling a wellbore, such as a subsea well or a land well. Further, it will be understood that the present disclosure is not limited to only drilling an oil well. The present disclosure also encompasses natural gas wellbores, other hydrocarbon wellbores, or wellbores in general. Further, the present disclosure may be used for the exploration and formation of geothermal wellbores intended to provide a source of heat energy instead of hydrocarbons.

Accordingly, FIG. 1 shows a tool string 126 disposed in a directional borehole 116. The tool string 126 including a rotary steerable tool 128 in accordance with various embodiments. The rotary steerable tool 128 provides full 3D directional control of the drill bit 114. A drilling platform 102 supports a derrick 104 having a traveling block 106 for raising and lowering a drill string 108. A kelly 110 supports the drill string 108 as the drill string 108 is lowered through a rotary table 112. In one or more embodiments, a topdrive is used to rotate the drill string 108 in place of the kelly 110 and the rotary table 112. A drill bit 114 is positioned at the downhole end of the tool string 126, and, in one or more embodiments, may be driven by a downhole motor 129 positioned on the tool string 126 and/or by rotation of the entire drill string 108 from the surface. As the bit 114 rotates, the bit 114 creates the borehole 116 that passes through various formations 118. A pump 120 circulates drilling fluid through a feed pipe 122 and downhole through the interior of drill string 108, through orifices in drill bit 114, back to the surface via the annulus 136 around drill string 108, and into a retention pit 124. The drilling fluid transports cuttings from the borehole 116 into the pit 124 and aids in maintaining the integrity of the borehole 116. The drilling fluid may also drive the downhole motor 129.

The tool string 126 may include one or more logging while drilling (LWD) or measurement-while-drilling (MWD) tools 132 that collect measurements relating to various borehole and formation properties as well as the position of the bit 114 and various other drilling conditions as the bit 114 extends the borehole 108 through the formations 118. The LWD/MWD tool 132 may include a device for measuring formation resistivity, a gamma ray device for measuring formation gamma ray intensity, devices for measuring the inclination and azimuth of the tool string 126, pressure sensors for measuring drilling fluid pressure, temperature sensors for measuring borehole temperature, etc.

The tool string 126 may also include a telemetry module 134. The telemetry module 134 receives data provided by the various sensors of the tool string 126 (e.g., sensors of the LWD/MWD tool 132), and transmits the data to a surface unit 138. Data may also be provided by the surface unit 138, received by the telemetry module 134, and transmitted to the tools (e.g., LWD/MWD tool 132, rotary steering tool 128, etc.) of the tool string 126. In one or more embodiments, mud pulse telemetry, wired drill pipe, acoustic telemetry, or other telemetry technologies known in the art may be used to provide communication between the surface control unit 138 and the telemetry module 134. In one or more embodiments, the surface unit 138 may communicate directly with the LWD/MWD tool 132 and/or the rotary steering tool 128. The surface unit 138 may be a computer stationed at the well site, a portable electronic device, a remote computer, or distributed between multiple locations and devices. The unit 138 may also be a control unit that controls functions of the equipment of the tool string 126.

The rotary steerable tool 128 is configured to change the direction of the tool string 126 and/or the drill bit 114, such as based on information indicative of tool 128 orientation and a desired drilling direction. In one or more embodiments, the rotary steerable tool 128 is coupled to the drill bit 114 and drives rotation of the drill bit 114. Specifically, the rotary steerable tool 128 rotates in tandem with the drill bit 114. In one or more embodiments, the rotary steerable tool 128 is a point-the-bit system or a push-the-bit system.

Figure 2A:
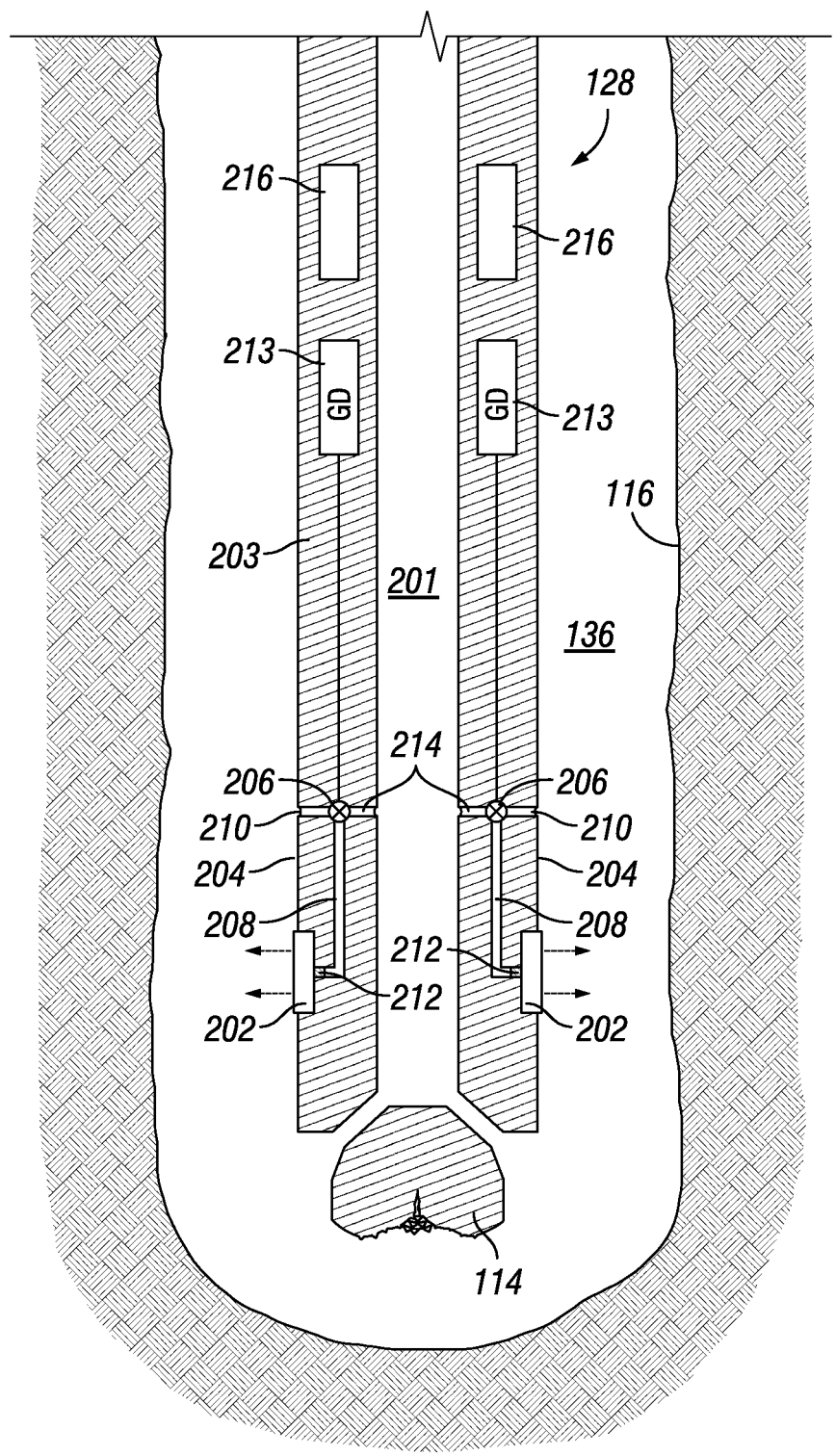
FIG. 2A depicts a cross-sectional schematic view of a rotary steerable system with a geolocation device, in accordance with one or more embodiments.

FIG. 2A depicts a cross-sectional schematic view of the rotary steerable tool 128 in the borehole 116, in accordance with one or more embodiments. The rotary steerable tool 128 includes a tool body 203 and a flowbore 201 through which drilling fluid flows. The rotary steerable tool 128 further includes one or more pads 202 located near the outer surface 204 of the rotary steerable tool 128. The pads 202 are configured to extend outwardly from the rotary steerable tool 128 upon actuation to direct the drill bit 114 towards a desired direction. Thus, the pads 202 are actuated into the extended position only when they are in a certain rotational position. Specifically, for a push-the-bit system, the resultant force of all the actuated pads applied on the wall of the borehole 116 should be in the opposite direction as the desired driving direction of the drill bit 114. Specifically, for a point-the-bit system, a fulcrum stabilizer can be positioned between the rotary steerable tool and the bit. In the case of the point system, the resultant force of all the actuated pads applied on the wall of the borehole 116 should be in the same direction as the desired driving direction of the bit 114. As the pads 202 are only put into the extended position when in the appropriate position during rotation of the rotary steerable tool 128, the pads 202 are pulled back to the tool once they are no longer in the appropriate position. The pads 202 can each be controlled independently or in groups. In one or more embodiments, hydraulic pressure is directed to the desired pad 202 or an associated piston 212 to actuate the extension of the pad 202. However, any suitable means of actuation, including for example mechanical or electrical actuation, may be used.

As an example of hydraulic actuation, in one or more embodiments, extension of the pads 202 is enabled by generating a pressure differential between the flowbore 201 of the tool string 126 and the annulus 136 surrounding the tool string 126 and inside the borehole 116. Specifically, the pads 202, or intermediate actuation devices such as pistons 212, are each coupled to the flowbore 201 via a supply path 214 and actuation path 208 formed in the tool body 203. The actuation path 208 is also coupled to a bleed path 210 formed in the tool body which hydraulically couples to the annulus 136. The supply path 214 is coupled to the actuation path 208 via an electrically actuated valve 206, such as a solenoid valve.

Figure 2B:
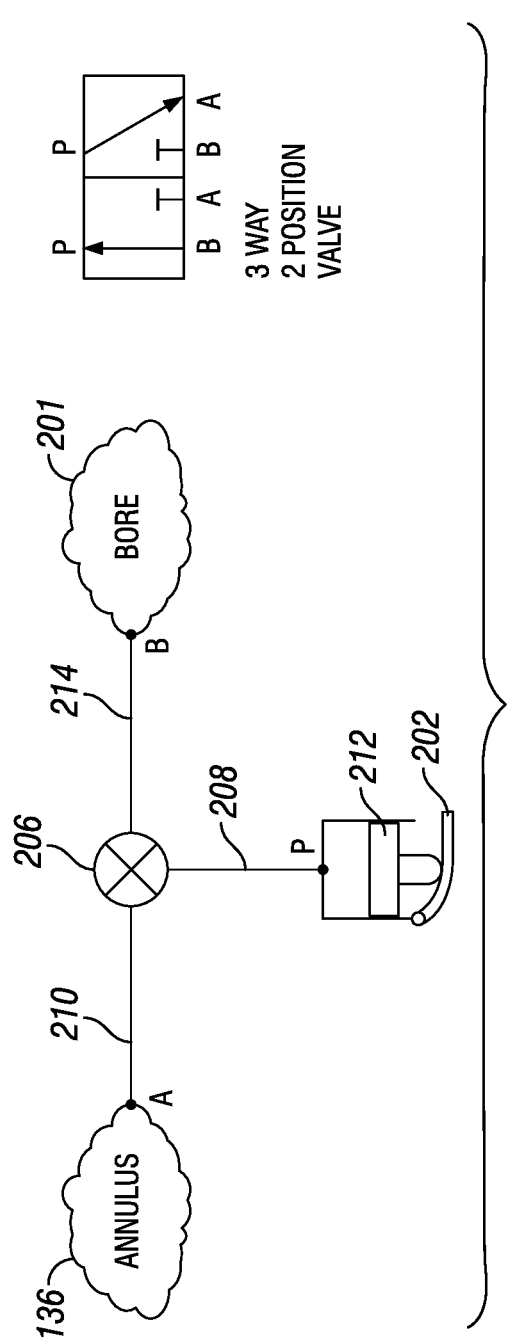
FIG. 2B depicts an example hydraulic configuration of the rotary steerable system, in accordance with one or more embodiments.
Figure 2C:
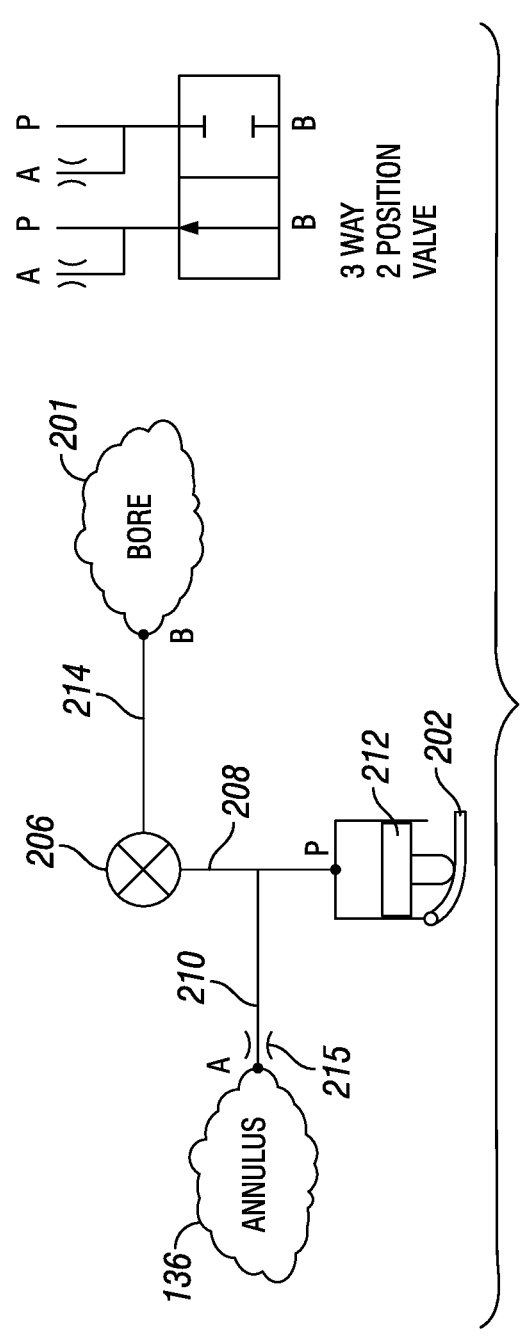
FIG. 2C depicts another example hydraulic configuration of the rotary steerable system, in accordance with one or more embodiments.

The valve 206 can be controlled to hydraulically couple and decouple the actuation path 208 from the supply path 214. Valve and flow path configurations include but are not limited to the following configurations as depicted in FIGS. 2B and 2C. As depicted in FIG. 2B, when the valve 206 is actuated, the actuation path 208 and the supply path 214 are coupled to the flowbore 201. Due to the pumping of drilling fluid into the flowbore 201 and the pressure drop at the bit, the flowbore 201 is at a high pressure relative to the annulus 136. As a result drilling fluid flows into the actuation path 208 from the flowbore 201. The increase in pressure in the actuation path 208 actuates extension of the piston 212 and pad 202. During activation, the activation path 208 is closed to the bleed path 210 and thus full differential pressure, between the flowbore 201 and annulus 136, is applied to the piston 212. During deactivation of the valve 206, the activation path 208 is open to the bleed path 210 and piston 212 is allowed to push the fluid to the annulus 136 via the bleed path 210. As depicted in FIG. 2C, when the valve 206 is actuated, the actuation path 208, supply path 214, and bleed path 210 are coupled to the flowbore 201 and to each other. Due to the pumping of drilling fluid into the flowbore 201 and the pressure drop at the bit, the flowbore 201 is at a high pressure relative to the annulus 136. As a result, drilling fluid flows into the actuation path 208 and bleed path 210 from the flowbore 201. The increase in pressure in the actuation path 208 actuates extension of the piston 212 and pad 202. It should be noted that some volume of fluid is flowing to the annulus via the bleed path 210, and that sufficient restriction 215 is necessary to maintain sufficient pressure differential between the flowbore 201 and annulus 136 in order to extend the piston 212 and pad 202. During deactivation of the valve 206, the activation path 208 is open to the bleed path 210 and piston 212 is allowed to push the fluid to the annulus 136 via the bleed path 210. In one or more embodiments, the piston 212 is coupled to the actuation path and the increase in pressure actuates a piston 212. The piston 212 may extend outward upon actuation and push the pad 202 outward. In one or more embodiments, the pad 202 is absent and the piston 212 pushes against the borehole 116.

Each pad 202 can be opened independently through actuation of the respective valve 206. Any subset or all of the pads 202 can be opened at the same time. The valves 206 are controlled by a central geolocation device 213 discussed in more detail below. In one or more embodiments, the amount of force by which piston 212 or pad 202 pushes against the borehole 116 or the amount of extension may be controlled by controlling the flow of drilling fluid into the actuation path 208, which can be controlled via the valve 206 or various other valves or orifices places along the actuations path 208 or the bleed path 210. This helps enable control over the degree of direction change of the drill bit 114. In addition to the aforementioned geostationary device, the rotary steerable tool 128 may contain one or more sensors 216 for making any measurement including measurement while drilling data, logging while drilling data, formation evaluation data, and other well data.

Figure 3A:
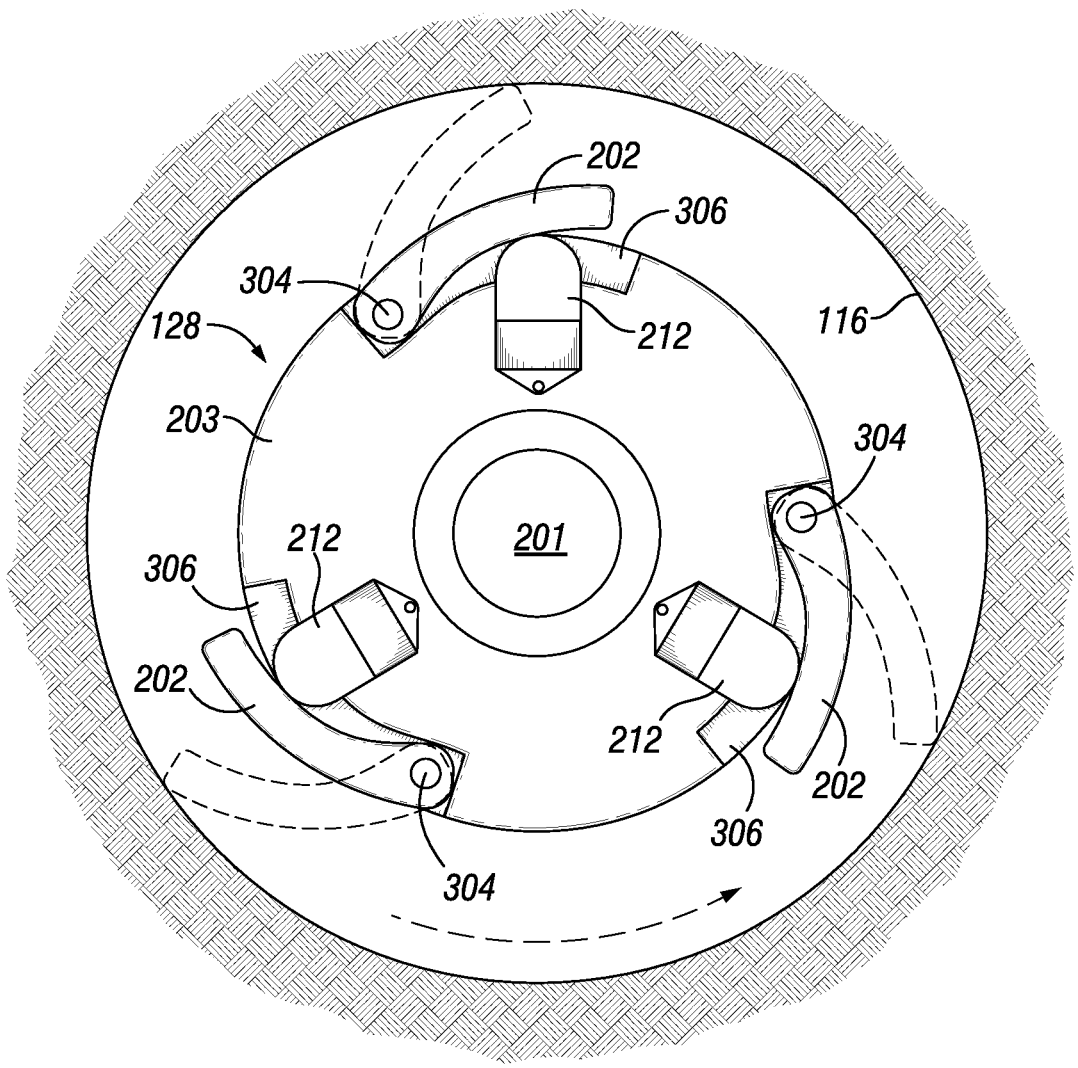
FIG. 3A depicts a radial cross-sectional schematic view of the rotary steerable system with a geolocation device, in accordance with one or more embodiments.

FIG. 3A depicts a radial cross-sectional schematic view of the rotary steerable tool 128, showing the pads 202. As shown, the pads 202 are close to the tool body 203 in a closed position and configured to extend outward into an open or actuated position. In the illustrated example, the pads 202 are coupled to the tool body 203 and pivot between the closed and open positions via hinges 304. As mentioned above, the pads 202 can be pushed outward and into the open position by the pistons 212. In the illustrated embodiment, the tool body 203 includes recesses 306 which house the pads 202 when in the closed position, thereby allowing the pads 202 to be flush with the tool body 203.

As shown, the rotary steerable tool 128 includes three pads spaced 120 degrees apart around the circumference of the tool 128. However, the rotary steerable tool 128 can have more or less than the three pads 202 shown. The rotary steerable tool 128 can even have as few as one pad 202. The pad 202 and piston 212 mechanism is just one configuration of an extendable mechanism designed to push against the wall of the borehole 116 to urge the drill bit 114 in a direction. The rotary steerable tool 128 may include various other types of extendable members or mechanisms, including but not limited to pistons configured to push against the borehole 116 directly or pads 202 configured to be acted on by drilling fluid direction without an intermediate piston.

The pads 202, or alternative extendable members or mechanism, may also include a retraction mechanism that moves the pads 202 back into the closed position, such as when the pads 202 are out of the appropriate position. For example, the pads 202 may include a spring that pulls the pads 202 back into the closed position. In some other embodiments, the pads 202 may be configured to fall back into the closed position when pressure applied by the drill fluid at the pads drops. In some embodiments, the pads 202 are coupled to the piston 212 and thus travel with the piston 212. In one or more embodiments, the pads 202 may also function as centralizers, in which all the pads 202 remain in the extended position, keeping the rotary steerable tool 128 centralized in the borehole 116. In such embodiments, the retraction mechanism can be disabled or not included. One of the key benefits of being able to keep the pads retracted is reduced wear on the pads 202 and pistons 212.

Figure 3B:
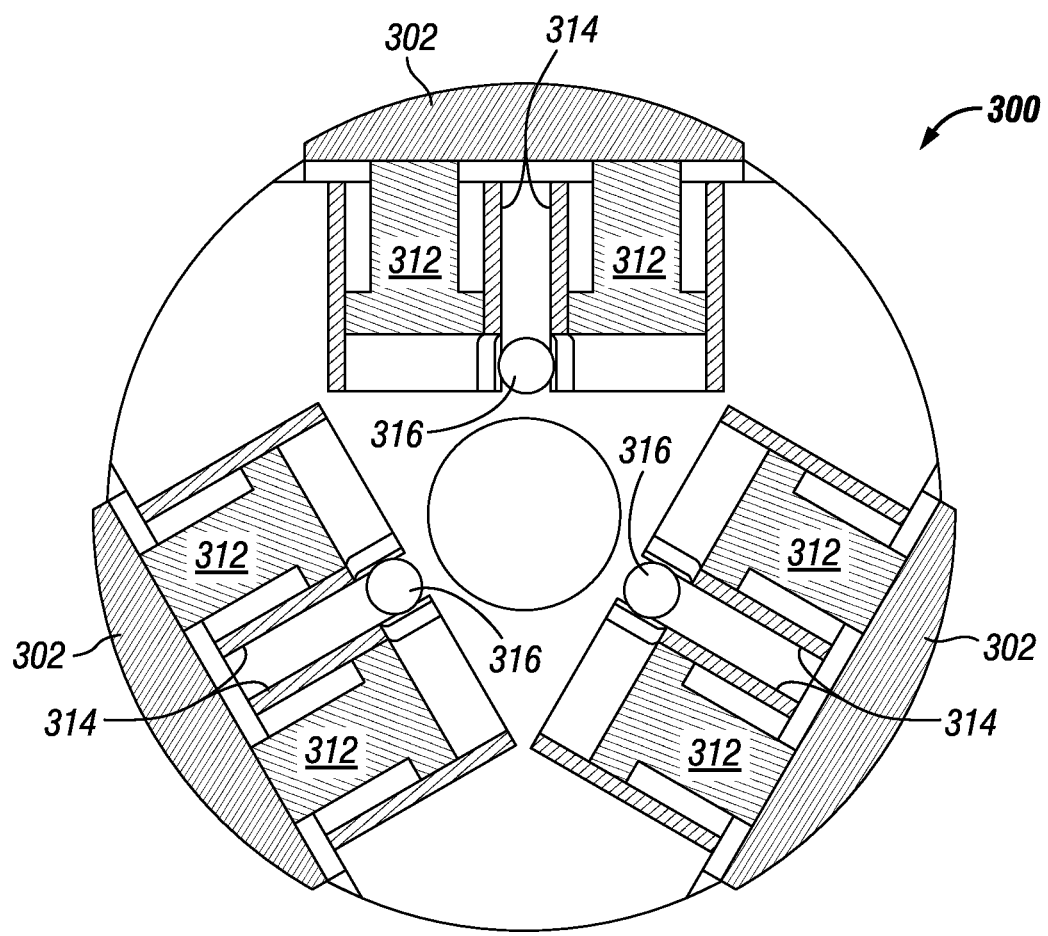
FIG. 3B depicts a radial cross-sectional schematic view of another example embodiment of the rotary steerable system with a geolocation device, in accordance with one or more embodiments.

FIG. 3B depicts a radial cross-sectional schematic view of another example rotary steerable tool 300, with a different pad and piston configuration. Specifically, the tool 300 includes a plurality of pads 302 located around the tool 300 and a plurality of pistons 312 configured to push the pads 302 outwardly. In some embodiments, and as illustrated, each pad 302 is pushed by two pistons 312. The pistons 312 may also be coupled to the respective pads 302. Each piston 312 is coupled to a hydraulic line 316 which provides a source of hydraulic pressure. Additionally, in some embodiments, each piston 312 includes a wear sleeve 314 for protecting the parts from wear caused by movement of the piston 312.

Figure 4A:
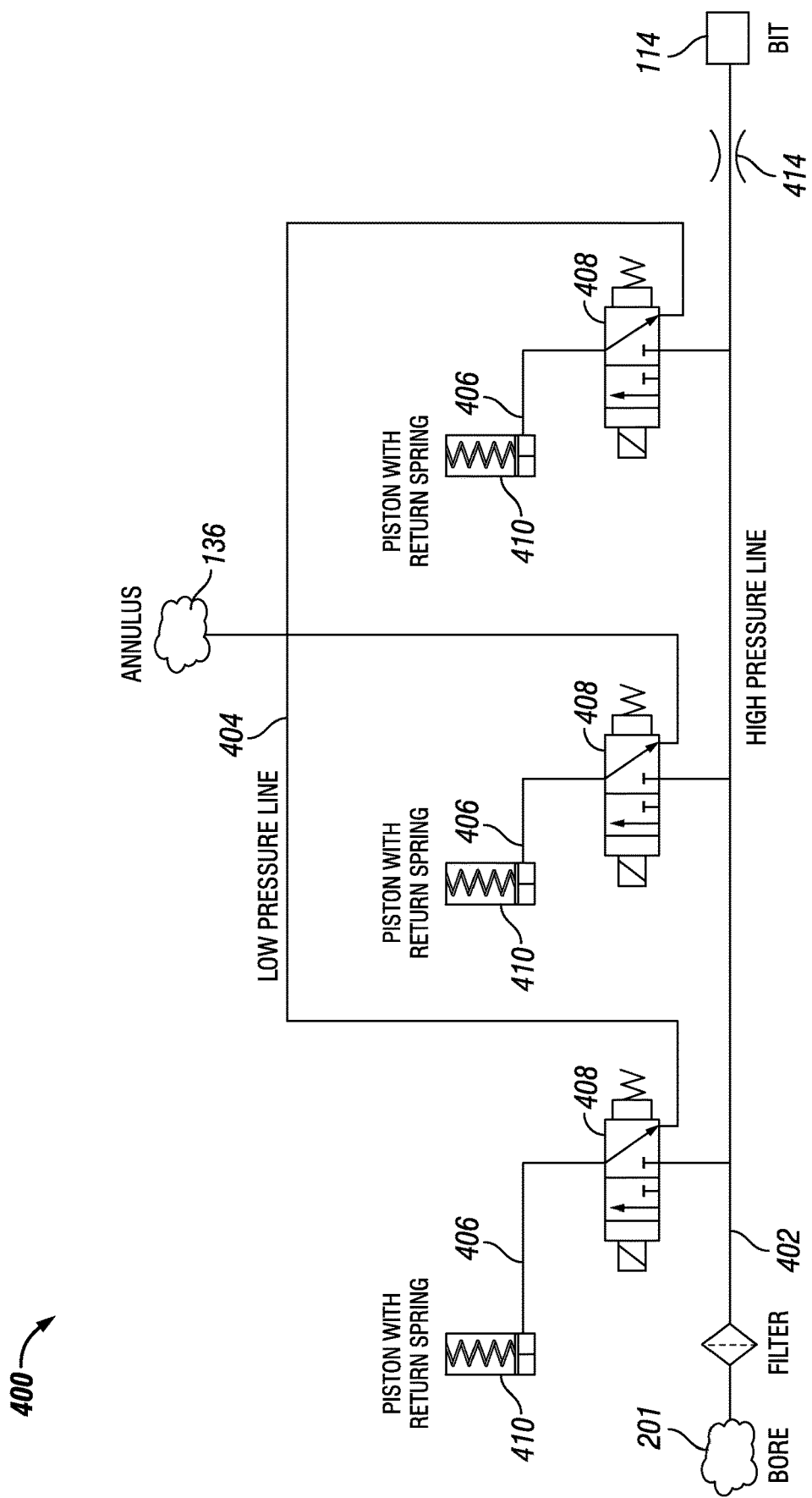
FIG. 4A depicts an example hydraulic circuit of the rotary steerable tool, in accordance with one or more embodiments.

FIG. 4A depicts a hydraulic circuit 400 of the rotary steerable tool 128 using hydraulic actuation to move the pads 202, in accordance with one or more embodiments. FIG. 4A is the embodiment of multiple 3 way-2 position valves that utilize differential mud pressure between the bore 201 and annulus 136. The hydraulic circuit 400 utilizes a pressure differential between the drilling fluid pumped into the rotary steerable tool 128 and the annulus 136 around the rotary steerable tool 128. The hydraulic circuit 400 includes a high pressure line 402, which represents the inside of the tool into which fluid is pumped, and a low pressure line 404, which represents the annulus 136. The high pressure line 402 is coupled to the drill bit 114, which provides flow restriction and the resulting differential pressure. Additionally, a flow restrictor 414 can be added to increase pressure differential in the case that the bit, alone, does not provide a sufficient pressure differential. The high pressure line 402 is also coupled to one or more electrically actuated valves 408. Each electric valve 408 is also coupled to a hydraulic piston line 406, and the low pressure line 404. Generally, there are as many hydraulic piston lines 406 as there are pistons 410 or pads 202 on the rotary steerable tool 128. The electrically actuated valves 408 separate the high pressure line 402 from the hydraulic piston lines 406, thereby separating the high pressure line 402 from the pistons 410. The electrically actuated valves 408 also separate the hydraulic pad lines 406 from the low pressure line 404, thereby separating the pistons 410 from the low pressure line 404.

The electrically actuated valves 408 can be individually controlled to couple or decouple the high pressure line 402 and each of the hydraulic pad lines 406. Specifically, in one or more embodiments, when an electrically actuated valve 408 is actuated, the high pressure line is in fluid communication with the respective hydraulic piston line 406 and the respective piston 410. The pressure differential between the low pressure line 404 and the high pressure line 402 pushes drilling fluid through the respective hydraulic piston line 406, thereby actuating the piston 410. Actuation of the piston 410 causes pad extension or another protrusion to extend outwardly from the rotary steerable tool 128, applying a force on the wellbore, thereby changing the drilling direction. When an electrically actuated valve 408 is deactivated, the respective piston 410 is isolated from the high pressure line 402, and the piston 410 is in fluid communication with the low pressure line 404, allowing the piston 410 to retract and drain fluid through the low pressure line 404 to the annulus 136.

Figure 4B:
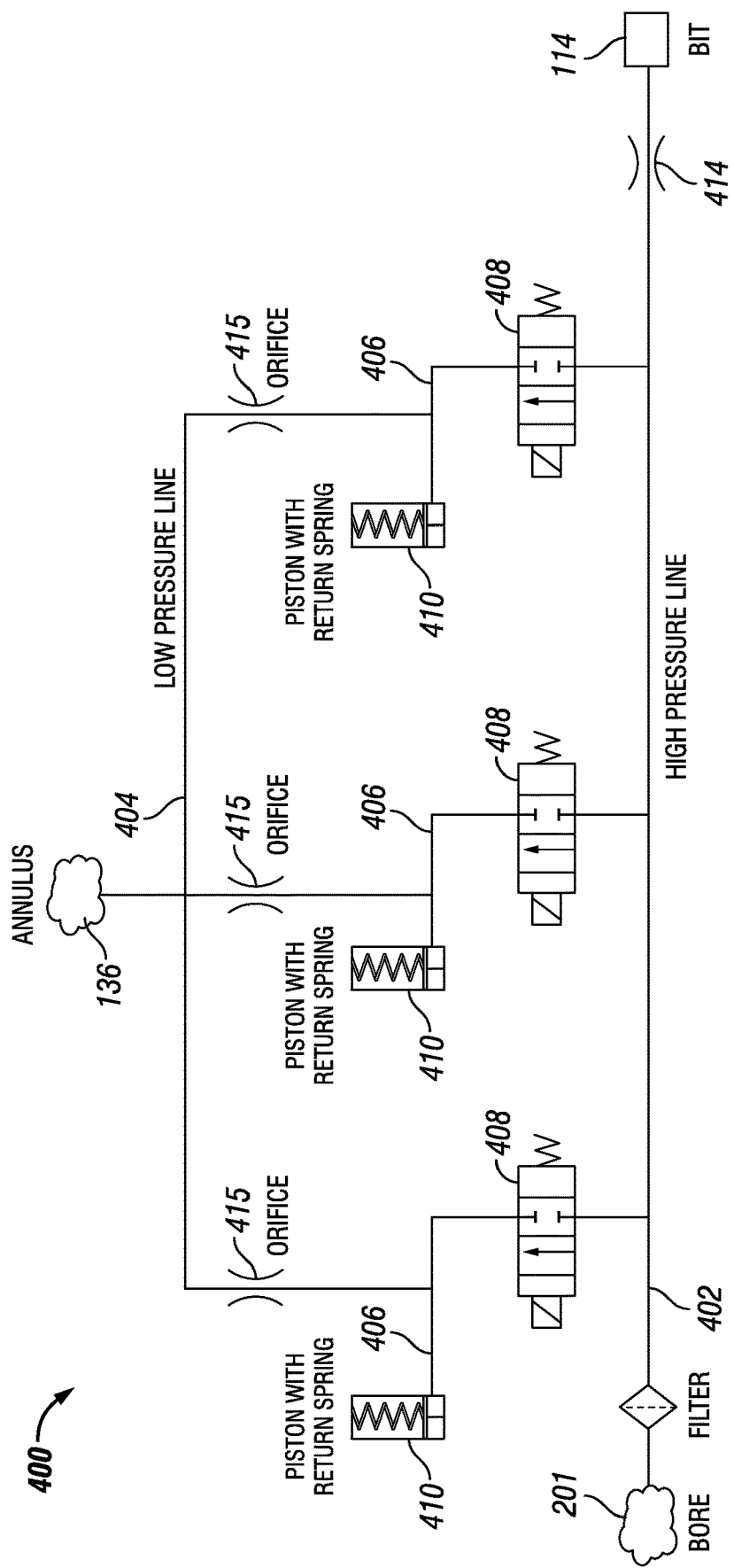
FIG. 4B depicts another example hydraulic circuit of the rotary steerable tool, in accordance with one or more embodiments.

FIG. 4B depicts a hydraulic circuit 400 of the rotary steerable tool 128 using hydraulic actuation to move the pads 202, in accordance with one or more embodiments. FIG. 4B is the embodiment of multiple 2 way-2 position valves that utilize differential mud pressure between the bore 201 and annulus 136. The hydraulic circuit 400 utilizes a pressure differential between the drilling fluid pumped into the rotary steerable tool 128 and the annulus 136 around the tool 128. The hydraulic circuit 400 includes a high pressure line 402, which represents the inside of the tool into which fluid is pumped, and a low pressure line 404, which represents the annulus 136. The high pressure line 402 is coupled to the drill bit 114, which provides flow restriction and the resulting differential pressure. Additionally, if necessary, a flow restrictor 414 can be added to increase pressure differential in the case where the bit, alone, does not provide a sufficient pressure differential.

The high pressure line 402 is also coupled to one or more electrically actuated valves 408. Each electric valve 408 is also coupled to a hydraulic piston line 406 and the low pressure line 404. Generally, there are as many hydraulic piston lines 406 as there are pistons 410 or pads 202 on the rotary steerable tool 128. The electrically actuated valves 408 separate the high pressure line 402 from the hydraulic pad lines 406, thereby separating the high pressure line 402 from the pistons 410 and the low pressure line 404. The electrically actuated valves 408 can be individually controlled to couple or decouple the high pressure line 402 and each of the hydraulic piston lines 406. Specifically, in one or more embodiments, when an electrically actuated valve 408 is actuated, the high pressure line is in fluid communication with the respective hydraulic piston line 406, its respective piston 410, and the low pressure line 404. The pressure differential between the low pressure line 404 and the high pressure line 402 pushes drilling fluid through the respective hydraulic piston line 406, thereby actuating the piston 410.

Actuation of the piston 410 causes pad extension or another protrusion to extend outwardly from the rotary steerable tool 128, applying a force on the wellbore, thereby changing the drilling direction. It should be noted that some volume of fluid is flowing to the annulus via the low pressure line 404 and that sufficient restriction 415 is necessary to maintain sufficient pressure differential, between the flowbore 201 and annulus 136 in order to extend the piston 410 and pad 202. When an electrically actuated valve 408 is deactivated, the respective piston 410 is isolated from the high pressure line 402, and the piston 410 is in fluid communication with the low pressure line 404, allowing the piston 410 to retract and drain fluid through the low pressure line 404 to the annulus 136.

Figure 5A:
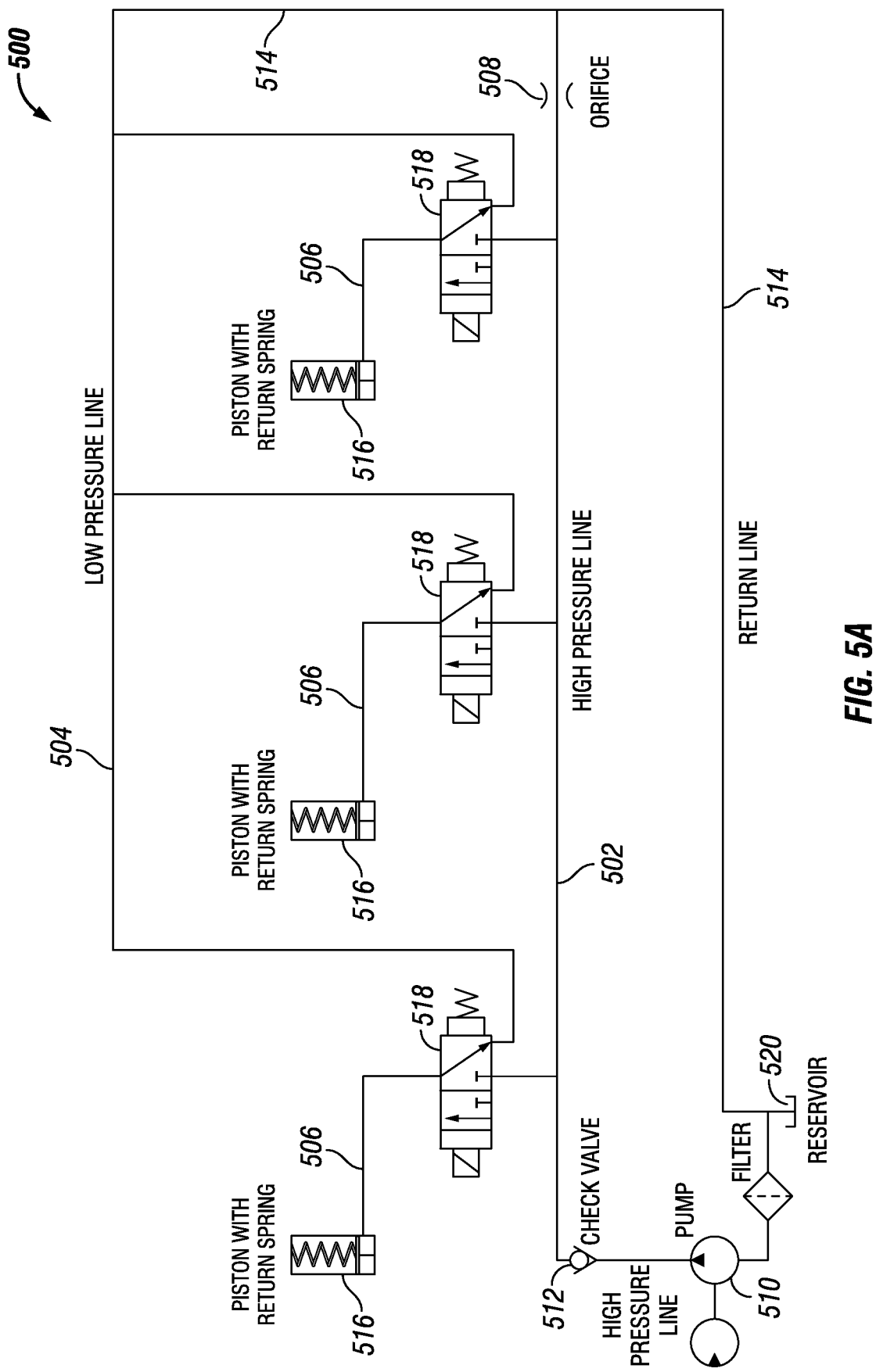
FIG. 5A depicts an example of an internal hydraulic system of the rotary steerable tool, in accordance with one or more embodiments.

FIG. 5A depicts an embodiment of an internal hydraulic system 500 that can be used with the rotary steerable tool 128 using hydraulic actuation to move the pads 202, in accordance with one or more embodiments. In one or more embodiments, the hydraulic system 500 is contained within the rotary steerable tool 128 (i.e., not open to the annulus) and may utilize a general hydraulic fluid. The hydraulic system 500 includes a high pressure line 502 and a low pressure line 504. FIG. 5A is the embodiment of multiple 3 way-2 position valves that utilize differential hydraulic pressure between the high pressure line 502 and low pressure line 504. The high pressure line 502 is coupled to one or more electrically actuated valves 518. Each electric valve 518 is also coupled to a hydraulic piston line 506, and the low pressure line 504. Generally, there are as many hydraulic piston lines 506 as there are pistons 516 or pads 202 on the rotary steerable tool 128. The electrically actuated valves 518 separate the high pressure line 502 from the hydraulic piston lines 506, thereby separating the high pressure line 502 from the pistons 516. The electrically actuated valves 518 also separate the hydraulic piston lines 506 from the low pressure line 504, thereby separating the pistons 516 from the low pressure line 504.

The electrically actuated valves 518 can be individually controlled to couple or decouple the high pressure line 502 and each of the hydraulic piston lines 506. Specifically, in one or more embodiments, when an electrically actuated valve 518 is actuated, the high pressure line is in fluid communication with the respective hydraulic piston line 506 and the respective piston 516. The pressure differential between the low pressure line 504 and the high pressure line 502 pushes hydraulic fluid through the respective hydraulic piston line 506, thereby actuating the piston 516. Actuation of the piston 516 causes pad extension or another protrusion to extend outwardly from the rotary steerable tool 128, applying a force on the wellbore, thereby changing the drilling direction. When an electrically actuated valve 518 is deactivated, the respective piston 516 is isolated from the high pressure line 502, and the piston 516 is in fluid communication with the low pressure line 504, allowing the piston 516 to retract and drain fluid through the low pressure line 504 to the return line 514.

Figure 5B:
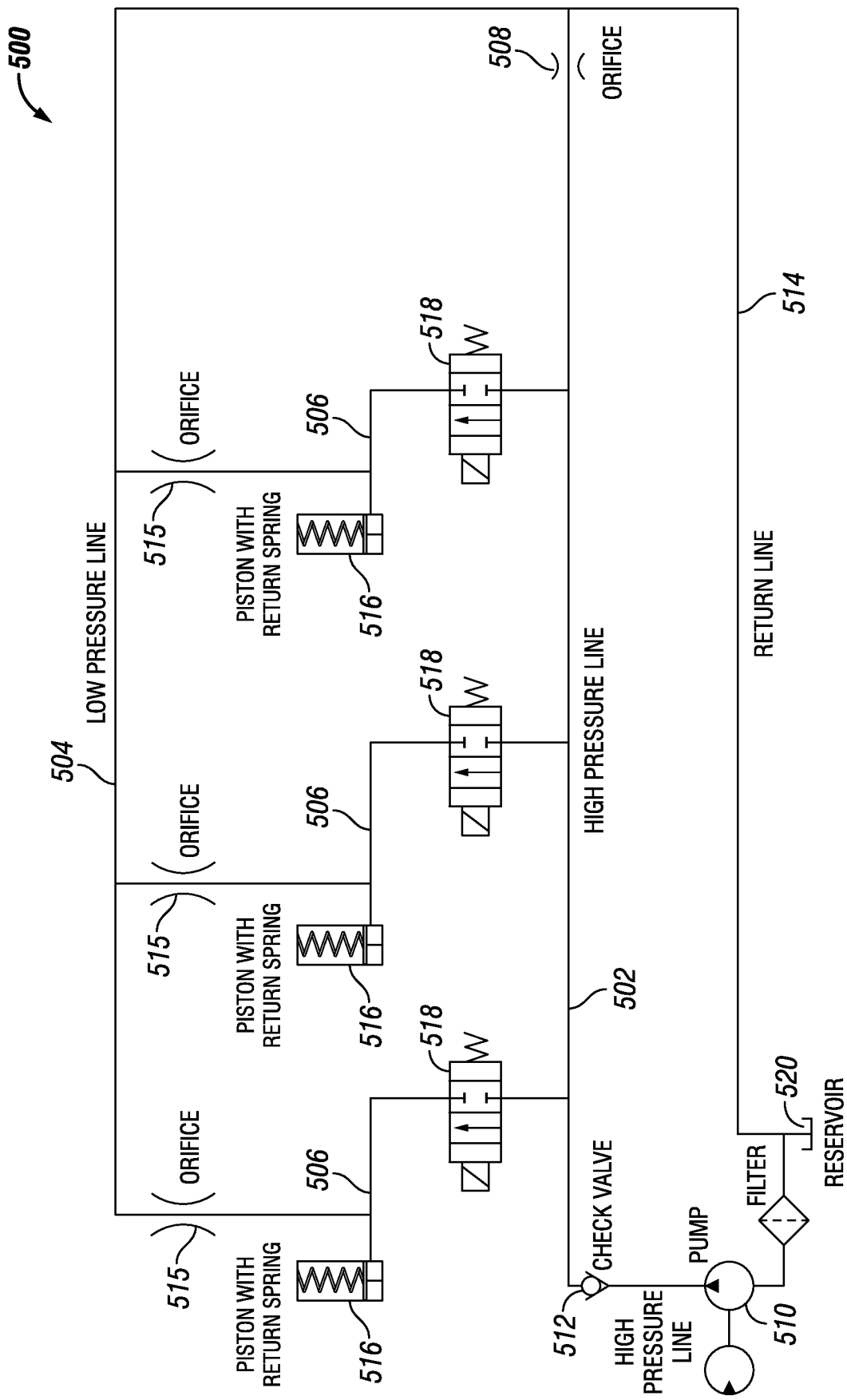
FIG. 5B depicts another example of an internal hydraulic system of the rotary steerable tool, in accordance with one or more embodiments.

FIG. 5B depicts an embodiment of an internal hydraulic system 500 that can be used with the rotary steerable tool 128 using hydraulic actuation to move the pads 202, in accordance with one or more embodiments. In one or more embodiments, the hydraulic system 500 is contained within the rotary steerable tool 128 (i.e., not open to the annulus) and may utilize a general hydraulic fluid. The hydraulic system 500 includes a high pressure line 502 and a low pressure line 504. FIG. 5B is the embodiment of multiple 2 way-2 position valves that utilize differential hydraulic pressure between the high pressure line 502 and low pressure line 504. The high pressure line 502 is also coupled to one or more electrically actuated valves 518. Each electric valve 518 is also coupled to a hydraulic piston line 506 and the low pressure line 504. Generally, there are as many hydraulic piston lines 506 as there are pistons 516 or pads 202 on the rotary steerable tool 128. The electrically actuated valves 518 separate the high pressure line 502 from the hydraulic pad lines 506, thereby separating the high pressure line 502 from the pistons 516 and the low pressure line 504.

The electrically actuated valves 518 can be individually controlled to couple or decouple the high pressure line 502 and each of the hydraulic piston lines 506. Specifically, in one or more embodiments, when an electrically actuated valve 518 is actuated, the high pressure line is in fluid communication with the respective hydraulic piston line 506, its respective piston 516, and the low pressure line 504. The pressure differential between the low pressure line 504 and the high pressure line 502 pushes hydraulic fluid through the respective hydraulic piston line 506, thereby actuating the piston 516. Actuation of the piston 516 causes pad extension or another protrusion to extend outwardly from the rotary steerable tool 128, applying a force on the wellbore, thereby changing the drilling direction. It should be noted that some volume of fluid is flowing to the low pressure line 504 and that sufficient restriction 515 is necessary to maintain sufficient pressure differential, between the high pressure line 502 and low pressure line 504. When an electrically actuated valve 518 is deactivated, the respective piston 516 is isolated from the high pressure line 502, and the piston 516 is in fluid communication with the low pressure line 504, allowing the piston 516 to retract and drain fluid through the low pressure line 504 to the return line 514.

The internal hydraulic system 500 further includes a pump 510 and a reservoir 520 for the hydraulic fluid. The pump 510 draws hydraulic fluid from the reservoir 520 and circulates the hydraulic fluid. In one or more embodiments, the internal hydraulic system 500 includes a return line 514 coupled to the low pressure line 504 through which hydraulic fluid is circulated back to the reservoir 520. High pressure line 502 may also be coupled to the return line such that the hydraulic fluid can continue to circulate when none of the electrically actuated valves 518 are actuated and the high pressure line 502 is not in communication with the low pressure line 504. In one or more embodiments, the high pressure line 502 and the return line 514 are separated by a flow restrictor 508 which restricts the flow between the high pressure line 502 and the return line, thereby maintaining a relatively higher pressure in the high pressure line 502. The high pressure line 502 may also include a check valve 512 configured to prevent back flow.

Figure 6:
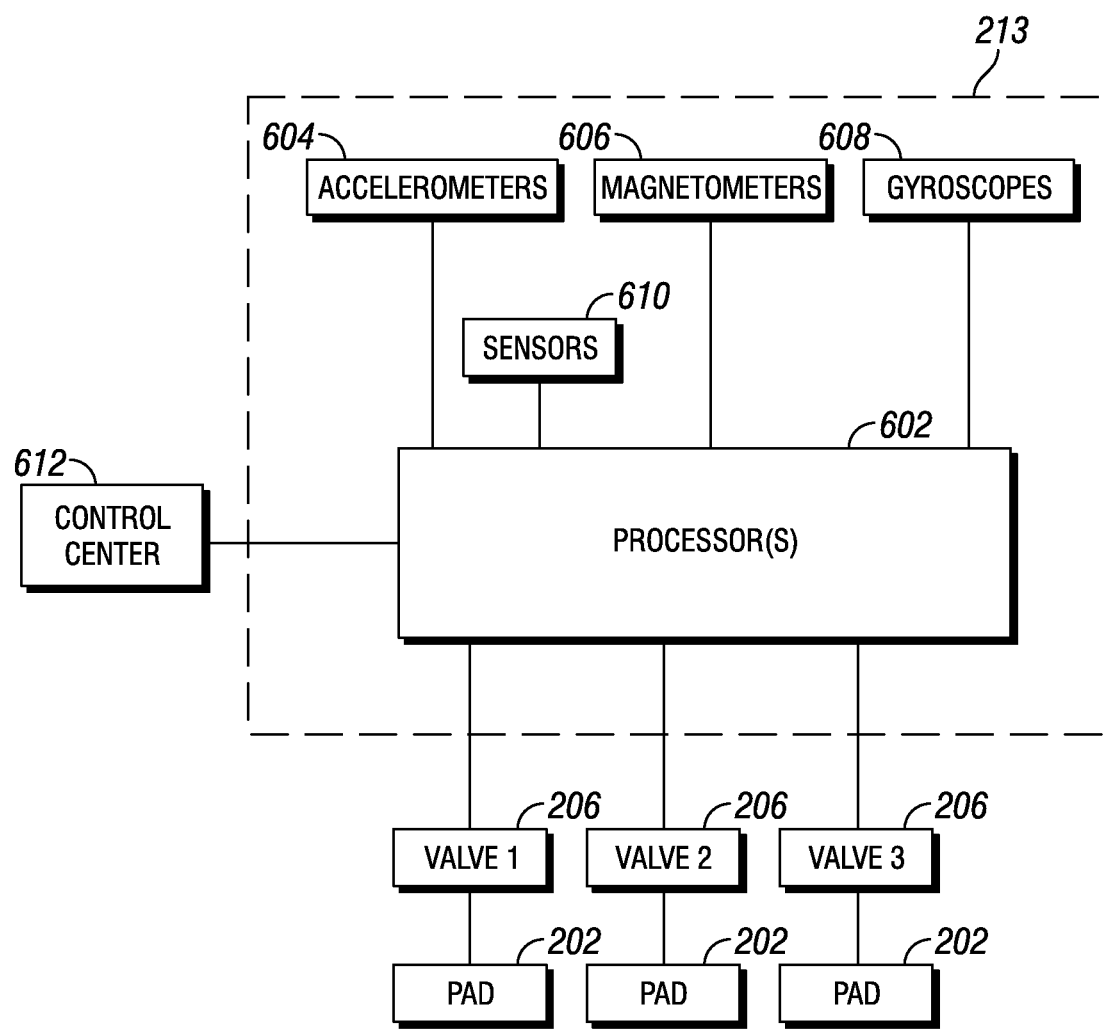
FIG. 6 depicts a block diagram of a rotary steerable system with geolocation device, in accordance with one or more embodiments.

FIG. 6 depicts a block diagram of the geolocation device 213, in accordance with one or more embodiments. The geolocation device 213 includes a processor 602 and a suite of sensors, including directional sensors such as accelerometers 604, magnetometers 606, and gyroscopes 608, and the like for determining an azimuth or toolface angle of the drill bit 114 to a reference direction (e.g., magnetic north). The geolocation device 213 may include any number of these sensors and in any combination. Based on the azimuth and a desired drilling direction or drilling path, the rotary steerable tool 128 determines a suitable control scheme to steer the tool string 126 and drill bit 114 in the desired direction, thereby creating a directional borehole. The geolocation device 213 utilizes the sensors to maintain a geostationary reference for steering control of the rotary steerable tool 128 while the geolocation device 213 is also in rotation with the rotary steerable tool 128, without the need for a physically geostationary component. The geolocation device 213 may also include various other sensors 610 such as temperature sensors, magnetic field sensors, and rpm sensors, among others. The sensors are coupled to the processor 602. The sensors may be embedded anywhere on the rotary steerable tool 128 and are programmed or controlled to take respective measurements and transmit the measurements to the processor 602 in real time.

The processor 602 is configured to control the pads 202 through actuation of the valves 206 according to the measurements made by the sensors as well as a profile of the drilling operation, thereby controlling the drilling direction of the drill bit 114. The profile of the drilling operation may include information such as the location of the drilling target, type of formation, and other parameters regarding the specific drilling operation. As the tool 128 rotates, the sensors (e.g., accelerometers 604, magnetometers 606, and gyroscopes 608) continuously feed measurements to the processor 602 while rotating with the tool 128. The processor 602 uses the measurements to continuously track the position of the tool 128 with respect to the target drilling direction in real time. From this the processor 602 can determine which direction to direct the drill bit 114. Since the location of the pads 202 are fixed with respect to the tool 128, the location of the pads 202 can be easily derived from the location of the tool 128. The processor 602 can then determine when to actuate the pads 202 in order to direct the drill bit 114 in the desired direction. Each of the pads 202 on the tool 128 can be actuated independently, in any combination, and at any time interval, which allows for agile, fully three dimensional control of the direction of the drill bit 114. The directional control may be relative to gravity toolface, magnetic toolface, or gyro toolface.

For example, if the drill bit 114 needs to be directed towards high side (0 degree toolface angle), then the pads 202 need to extend and apply force against the borehole at the 180 degree location of the tool 128. Thus, a pad 202 is actuated when it rotates into the 180 degree location and retracts when it rotates out of the 180 degree location. In one or more embodiments, actuation of a pad 202 includes sending a current through the valve 206 to which the pad 202 is coupled. The valve 206 then couples the pad 202 to a hydraulic pressure differential, which actuates the pad 202. In one or more embodiments, each pad 202 is actuated as it rotates into the 180 degree location. Frequency of pad 202 extensions may depend on the speed of rotation of the tool 128 and the desired rate of direction change. For example, if the tool 128 is rotating at a relatively high speed, a pad 202 may only be actuated every other rotation. Similarly, if the desired rate of direction change of the tool 128 is high, the pad 202 may be actuated at a higher frequency than if the desired rate of direction change were lower. Such parameters can be controlled by the processor according to the profile of the drilling operation.

The processor 602 is in communication with a control center 612. The control center 612 may send instructions or information to the processor such as the information related to the profile of the drilling operation such as location of the drilling target, rate of direction change, and the like. In one or more embodiments, the control center 612 may receive spontaneous control commands from an operator which are relayed as processor-readable commands to the processor 602 of the geolocation device 213. In some other embodiments, the control center 612 sends preprogrammed commands to the processor 602 set according to the profile of the drilling operation. The geolocation device 213 receives power from a power source. Examples of power sources include batteries, mud generators, among others. The power supply actually used in a specific application can be chosen based on performance requirements and available resources.

In addition to the embodiments described above, many examples of specific combinations are within the scope of the disclosure, some of which are detailed below:

Example 1

A directional drilling system for drilling a directional well, comprising:
- a rotary steerable tool having a tool body comprising a flowbore;
- an extendable member configured to extend outwardly from the tool body upon actuation and which rotates with the rotary steerable tool while drilling the well;
- an electronic device having sensors configured to measure a position or location of the rotary steerable tool and which rotates with the rotary steerable tool while drilling the well; and
- a processor configured to receive an input from the sensors and to control actuation of the extendable member to deviate the rotary steering tool while drilling the well.

Example 2

The system of example 1, wherein:
- the rotary steerable tool further comprises an electrically actuated valve configured to control communication of hydraulic pressure to the extendable member from a hydraulic source; and
- communication of the hydraulic pressure causes the extendable member to extend outwardly from the rotary steerable tool.

Example 3

The system of example 2, wherein the hydraulic source is drilling fluid flowing through the flowbore.

Example 4

The system of example 2, wherein the hydraulic source is a hydraulic pump.

Example 5

The system of example 1, wherein the electronics device is configured to determine a position of the rotary steering tool and control actuation of the extendable member according to the position of the rotary steering tool and a target drilling direction.

Example 6

The system of example 1, further comprising a plurality of extendable members and wherein the electronics device is configured to control actuation of the each extendable member.

Example 7

The system of example 1, wherein the extendable member is retractable.

Example 8

The system of example 1, wherein the position of the rotary steerable tool comprises a rotational position, azimuth or toolface angle, an inclination angle, or any combination thereof.

Example 9

A method of directionally drilling a borehole, comprising:
rotating a tool within the borehole, wherein the tool comprises a geolocation electronics device and an extendable member, the geolocation electronics device and the extendable member rotating with the tool;
tracking a position of the rotating tool via the geolocation electronics device;
tracking a position of the rotating extendable member via the geolocation electronics device;
extending the extendable member outwardly into contact with a wall of the borehole upon the extendable member coming into a designated position with respect to the borehole; and
applying a force against the wall of the borehole to adjust the direction of the drilling of the borehole.

Example 10

The method of example 9, retracting the extendable member upon the extendable member rotating out of the designated position.

Example 11

The method of example 9, wherein the geo-locating electronics device comprises one or more directional sensors configured to rotate with the rotary steerable tool.

Example 12

The method of example 9, wherein extending the extendable member comprises actuating a valve, thereby putting the extendable member in fluid communication with a source of hydraulic pressure Example 13

The method of example 12, wherein the source of hydraulic pressure is drilling fluid flowing through a flowbore in the rotary steerable tool or a hydraulic pump within the tool.

Example 14

The method of example 9, further comprising extending one or more extendable members of the tool individually or as a group.

Example 15

A directional drilling system, comprising:
a rotary steerable tool, comprising:
an extendable member configured to extend outwardly from the rotary steerable tool upon actuation; and
an electronics device configured to measure a position or location of the rotary steerable tool and the extendable member and control actuation of the extendable member; and
wherein the electronics device and extendable member are configured to rotate with the rotary steerable tool.

Example 16

The system of example 15, comprising a plurality of extendable members, wherein the electronics device is configured to control actuation of the each extendable member.

Example 17

The system of example 15, wherein the extendable member is hydraulically actuated.

Example 18

The system of example 17, wherein the electronics device comprises a plurality of directional sensors configured to rotate in with the rotary steerable tool while measuring the position of the rotary steerable tool, and wherein the electronics device controls actuation of the extendable member according to the position of the rotary steering tool and a target drilling direction.

Example 19

The system of example 17, wherein the rotary steerable tool further comprises an electrically actuated valve, wherein the valve puts the extendable member in fluid communication with a source of hydraulic pressure in an actuated state.

Example 20

The system of example 19, wherein the source of hydraulic pressure is drilling fluid flowing through a flowbore within the rotary steerable tool or a hydraulic pump within the rotary steerable tool.

Example 21

The system of example 15, wherein the rotary steerable tool further comprises one or more sensors configured to collect well data, logging while drilling data, measurement while drilling data, formation evaluation data, or any combination thereof.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A directional drilling system for drilling a directional well using drilling fluid, comprising a rotary steerable tool comprising:
    a tool body comprising a flowbore;
    a supply path in communication with the drilling fluid flowing through the flowbore;
    an extendable member which rotates with the rotary steerable tool while drilling the well and is configured to extend outwardly from the tool body upon actuation from hydraulic pressure from the drilling fluid in the supply path;
    an electronic device having sensors configured to measure a position or location of the rotary steerable tool and which rotates with the rotary steerable tool while drilling the well; an electrically actuated valve located above the extendable member and configured to control communication of the hydraulic pressure to the extendable member from the drilling fluid;
    a bleed path located above the extendable member and configured to drain the hydraulic pressure from the rotary steerable tool to allow the extendable member to retract; and
    a processor configured to receive an input from the sensors and to control actuation of the extendable member to deviate the rotary steering tool while drilling the well.

2. The system of claim 1, wherein the rotary steerable tool comprises an electrically actuated valve configured to control communication of the hydraulic pressure to the extendable member from the drilling fluid; and.

3. The system of claim 1, wherein the electronics device is configured to determine a position of the rotary steering tool and control actuation of the extendable member according to the position of the rotary steering tool and a target drilling direction.

4. The system of claim 1, further comprising a plurality of extendable members and wherein the electronics device is configured to control actuation of each extendable member individually or as a group.

5. The system of claim 1, wherein the extendable member is retractable.

6. The system of claim 1, wherein the position of the rotary steerable tool comprises a rotational position, azimuth or toolface angle, an inclination angle, or any combination thereof.

7. A method of directionally drilling a borehole, comprising:
    rotating a tool within the borehole, wherein the tool comprises a geolocation electronics device and an extendable member, the geolocation electronics device and the extendable member rotating with the tool;
    tracking a position of the rotating tool via the geolocation electronics device;
    tracking a position of the rotating extendable member via the geolocation electronics device;
    flowing drilling fluid flowing through the tool into a supply path, the drilling fluid having a hydraulic pressure;
    extending the extendable member outwardly into contact with a wall of the borehole with the hydraulic pressure by electrically actuating a valve located above the extendable member, thereby putting the extendable member in communication with the hydraulic pressure upon the extendable member coming into a designated position with respect to the borehole;
    applying a force against the wall of the borehole to adjust the direction of the drilling of the borehole; and
    draining the hydraulic pressure to outside the tool through a bleed path located above the extendable member to allow the extendable member to retract.

8. The method of claim 7, retracting the extendable member upon the extendable member rotating out of the designated position.

9. The method of claim 7, wherein the geo-locating electronics device comprises one or more directional sensors configured to rotate with the rotary steerable tool.

10. The method of claim 7, wherein extending the extendable member comprises actuating a valve, thereby putting the extendable member in communication with the hydraulic pressure.

11. The method of claim 7, further comprising extending one or more extendable members of the tool individually or as a group.

12. A directional drilling system for drilling a directional well using drilling fluid, comprising a rotary steerable tool, comprising:
    a supply path in communication with the drilling fluid flowing through a flowbore through the rotary steerable tool;
    an extendable member configured to extend outwardly from the rotary steerable tool upon actuation from hydraulic pressure from the drilling fluid in the supply path;

an electronics device configured to measure a position or location of the rotary steerable tool and the extendable member and control actuation of the extendable member; an electrically actuated valve located above the extendable member, wherein the valve puts the extendable member in communication with the hydraulic pressure in an actuated state;

a bleed path located above the extendable member and configured to drain the hydraulic pressure outside of the rotary steerable tool to allow the extendable member to retract; and wherein the electronics device and extendable member are configured to rotate with the rotary steerable tool.

13. The system of claim 12, comprising a plurality of extendable members, wherein the electronics device is configured to control actuation of each extendable member individually or as a group.

14. The system of claim 12, wherein the electronics device comprises a plurality of directional sensors configured to rotate in with the rotary steerable tool while measuring the position of the rotary steerable tool, and wherein the electronics device controls actuation of the extendable member according to the position of the rotary steering tool and a target drilling direction.

15. The system of claim 12, wherein the rotary steerable tool further comprises an electrically actuated valve, wherein the valve puts the extendable member in communication with the hydraulic pressure in an actuated state.

16. The system of claim 12, wherein the rotary steerable tool further comprises one or more sensors configured to collect well data, logging while drilling data, measurement while drilling data, formation evaluation data, or any combination thereof.

* * * * *